July 12, 1966  C. T. KLEINER  3,260,919

REGULATED INVERTER CIRCUIT

Filed April 2, 1962  2 Sheets-Sheet 1

INVENTOR.
CHARLES T. KLEINER
BY Sidney Magnes
AGENT

INVENTOR.
CHARLES T. KLEINER

BY Sidney Magnes

AGENT

# United States Patent Office 3,260,919
Patented July 12, 1966

3,260,919
REGULATED INVERTER CIRCUIT
Charles T. Kleiner, Long Beach, Calif., assignor to North American Aviation, Inc.
Filed Apr. 2, 1962, Ser. No. 184,124
6 Claims. (Cl. 321—18)

CONVERTER

This invention relates to apparatus for converting direct current to alternating current; and more particularly to apparatus that protects the converting circuit from transient disturbances, while permitting the converting circuit to control and regulate the magnitude of the alternating current output.

BACKGROUND

It is well known that alternating current (A.C.) has a tremendous advantage in that it may be readily transformed from one voltage to another by means of transformers. High-frequency A.C. for example electric current that reverses at the rate of 400 times per second, has the additional advantage that the transformers are quite small. This combination of advantages is particularly attractive in airborne equipment, wherein light weight and small volumes are extremely desirable.

One of the most convenient ways of producing 400 cycle current for airplanes is to use a circuit known as a converter, which converts the D.C. from the airplane's battery to the 400 cycle electricity that is used by the various devices.

Many of these devices, or loads, have the characteristic that they are constantly switching between various states. In addition, new or additional loads are constantly being inserted into or taken out of service. The switching between states, and between loads, introduces transient signals that have undefined durations, amplitudes, frequencies, and waveforms. These transients in the past frequently disrupted the operation of the converter, for example, by short-circuiting the converter.

OBJECTS AND DRAWINGS

It is therefore the principal object of my invention to provide an improved converter circuit.

It is another object of my invention to provide an improved converter circuit that is protected from transient conditions produced by the load.

It is another object of my invention to provide an improved converter circuit whose operation is such as to control the amplitude of the output signal, or alternatively to regulate the output signal and thus maintain a predetermined amplitude.

Figure 1:
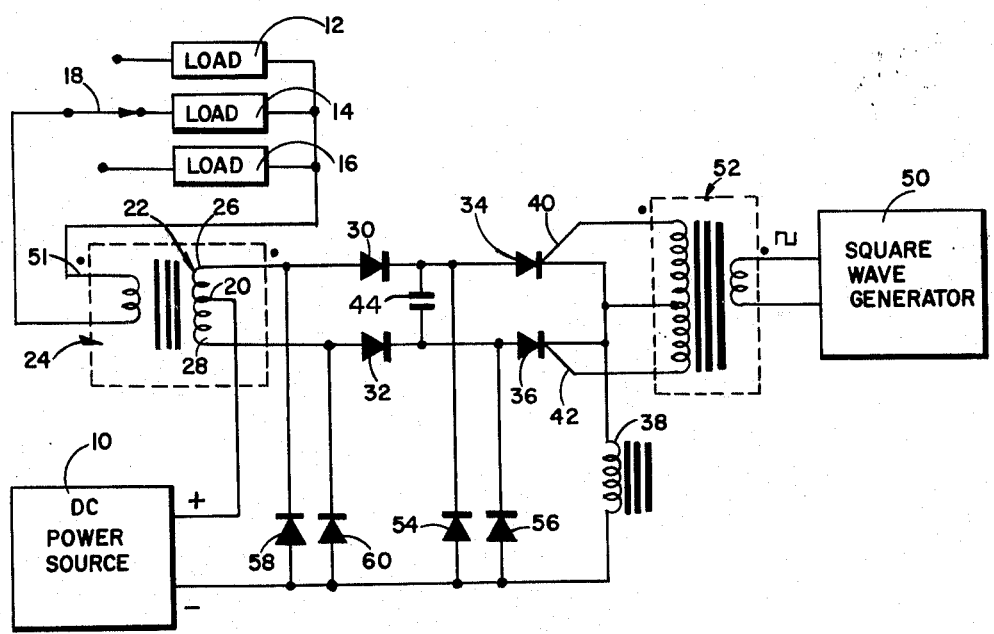
Figure 2:
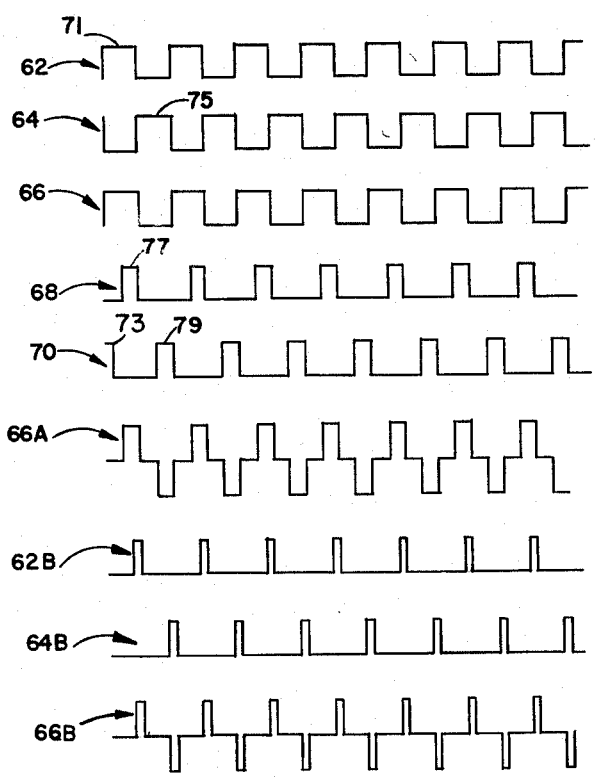
Figure 3:
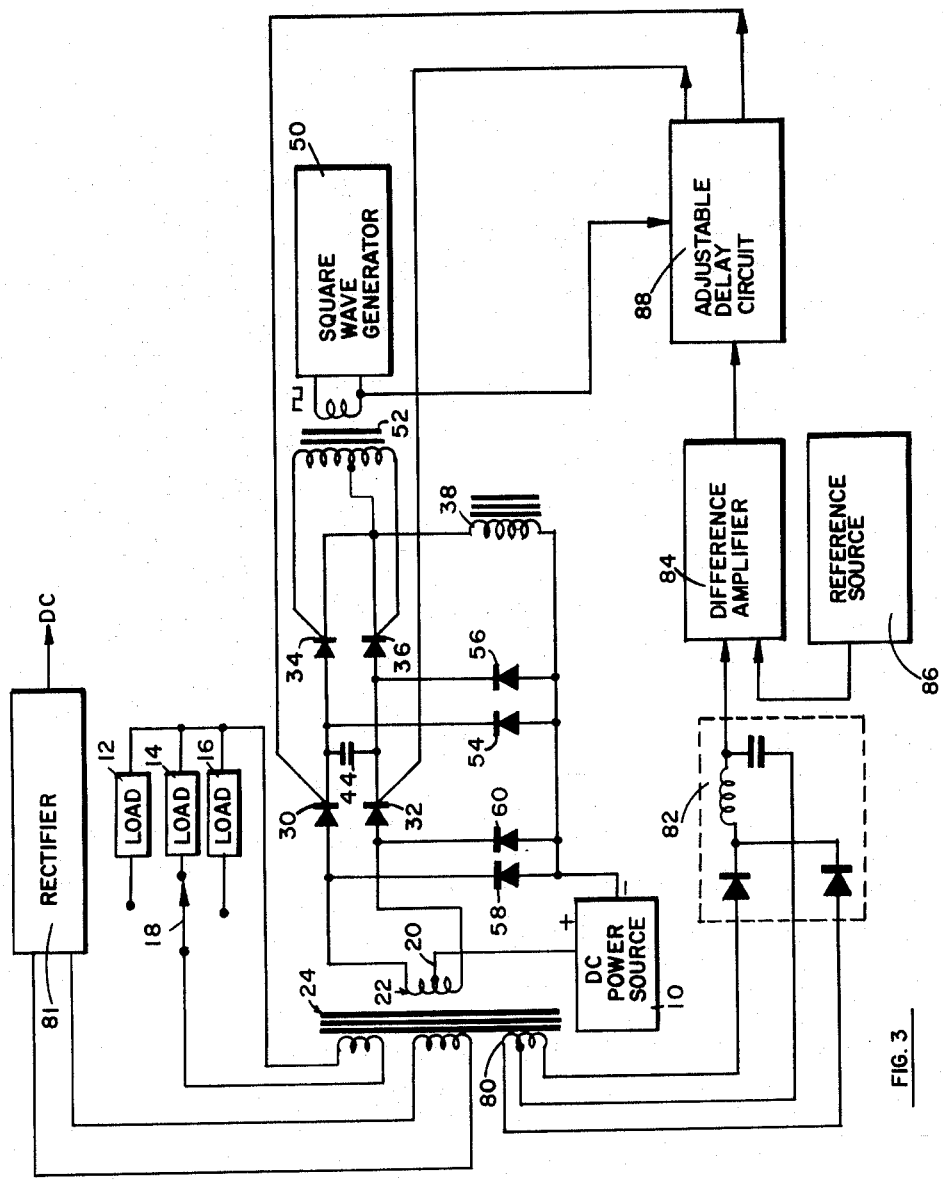

The attainment of these objects and others will be realized from the following specification, taken in conjunction with drawings, of which FIGURE 1 is a schematic diagram showing the basic concept of my invention;

FIGURE 2 is a series of waveforms that are present at various places in the circuit; and FIGURE 3 is a schematic-and-block diagram showing the regulating and controlling usage of my invention.

DESCRIPTION OF THE INVENTION

My invention will be readily understood from FIGURE 1, wherein a D.C. power source 10 has its output converted to an A.C. signal that supplies loads, such as 12, 14, and 16, that may be selected by means such as a switch 18. One terminal—say the positive one—of power source 10 is connected to the mid-point 20 of the input winding 22 of a transformer 24.

One end 26 of winding 22 is connected to one terminal of the combination of series-connected elements 30 and 34. With the shown polarity of power source 10, the anode of element 30 is connected to winding 22 and its cathode is connected to the anode of silicon controlled rectifier 34 and to a first terminal of condenser 44. The cathode of rectifier 34 is connected to a first terminal of smoothing inductor 38.

The second end 28 of winding 22 is connected to one terminal of the combination of series-connected elements 32 and 36. With the shown polarity of power source 10, the anode of element 32 is connected to winding 22 and its cathode is connected to the anode of silicon controlled rectifier 36 and to a second terminal of condenser 44. The cathode of rectifier 36 is connected to the above mentioned first terminal of inductor 38.

The second terminal of inductor 38 is connected to the second terminal (the negative one with the polarity shown) of power source 10.

Clamping diodes 54 and 56 are connected by their anodes to the negative terminal of power source 10 and by their cathodes to opposite terminals of condenser 44. Clamping diodes 58 and 60 are connected by their anodes to the negative terminal of power source 10 and by their cathodes to opposite ends of winding 22. Clamping diodes 54, 56, 58, and 60 are not essential to the circuit but do reduce voltage transients in the circuit.

Elements 30 and 32 may either be diode rectifiers (shown in FIG. 1) or silicon controlled rectifiers (shown in FIG. 3).

Instead of silicon controlled rectifiers, elements 30, 32, 34, and 36 may be rectifiers fabricated of other materials, which are adapted to be gated into conduction by applying a voltage of a predetermined polarity between a control electrode and one of the current carrying electrodes, and which are adapted to be gated into non-conduction by reducing the voltage between the current carrying electrodes. Such rectifiers will be called by the class name "controlled rectifiers."

When a controlled rectifier is gated into non-conduction, the rectifier is able to conduct in a forward direction but with a current-voltage characteristic similar to that of backward direction conduction. Thus a sufficiently high voltage may cause an appreciate current to flow in either direction through a closed-gate of a controlled rectifier.

A gate-controlling voltage generator which is preferably a squarewave generator 50 is connected, in phase-opposition, to the control electrodes of rectifiers 34 and 36 by a transformer 52. The neutral center tap of the secondary winding of transformer 52 is connected to the cathodes of rectifiers 34 and 36. Obviously transformer 52 could be part of square wave generator 50.

It is to be noted that if the controlled rectifiers had the characteristic wherein they could be gated into conduction by applying a control voltage (either positive or negative) with respect to their anodes, the polarity of source 10 and each of the rectifiers and diodes could be reversed without affecting the circuit operation.

In operation of the circuit of FIG. 1, in which elements 30 and 32 are diodes, before generator 50 is started only very small (substantially zero) leakage current flows in opposite directions through winding 22, generating no voltage across secondary winding 51. In a typical device the anodes of diodes 30 and 32 are at 28 volts, condenser 44 has no charge, and the cathodes of rectifiers 34 and 36 are at zero volts.

Assume that the first voltage supplied by generator 50 and transfer 52 causes control electrode 40 to become positive with respect to the cathode of rectifier 34 and causes control electrode 42 to become negative. Rectifier 34 is gated into conduction causing current to flow from the positive terminal of power source 10, through center-tap 20 and winding 22 to terminal 26, through diode 30, the anode-cathode path of rectifier 34, and smoothing inductor 38 to the negative terminal of power source 10. The sudden change in current through winding 22 depresses the voltage at terminal 26 and increases the voltage at terminal 28. The voltage at terminal 26 cannot become significantly negative because of the clamping action of diode 58. The voltage across diode 30 during conduction is small (typically of the order of one volt). Because condenser 44 is discharged, it is effectively a short circuit. The voltage across diode 32 causes diode 32 to conduct momentarily, charging condenser 44 to a voltage which is approximately twice that of the power source 10 with the positive voltage at the cathode of diode 32. The charging current is a short spike.

After a predetermined interval, the switching signal from square wave generator 50 is reversed, so that a negative voltage, with respect to the cathode, is applied to the control electrode of rectifier 40 and a positive voltage, with respect to the cathode, is applied to the control electrode of rectifier 36.

The positive gating signal at gating electrode 42 causes silicon controlled rectifier 36 to conduct from its anode to its cathode and, for a short transient interval, current flows through both silicon controlled rectifiers 34 and 36.

Capacitance 44 now discharges through the non-conductive silicon controlled rectifier 36 and from the cathode to anode of rectifier 34, reducing the net anode-to-cathode current to zero. The current now flows from the power source downward through the lower half of the input winding 22, through element 32, through silicon controlled rectifier 36, and through the smoothing inductor 38 back to the D.C. source 10. Commutating capacitor 44 now charges up, with the upper plate in FIG. 1 positive, to a value substantially twice that of the D.C. source; the non-transient current flowing through input winding 22 in the downward direction.

Commutating capacitance 44 thus periodically and alternately reduces the anode-to-cathode current of the silicon controlled rectifiers to zero, and thus causes the reversal of current flowing through the input winding 22 of transformer 24. The direction of current flow through input winding 22 is thus periodically reversed at a frequency controlled by square wave generator 50; and output winding 51 produces an alternating current that may be applied to the loads 12, 14, and 16.

As previously mentioned, the load circuits produce switching transients due to switching of switch 18; and were it not for units 30 and 32, these transients could affect the charging and discharging of commutating capacitor 44. If this were to happen, the commutating effect would be destroyed, the anode-to-cathode current of rectifiers 34 and 36 would be periodically reduced to zero, and the desired 400 cycle output signal would not be produced.

In my circuit, when a transient is produced in the load and coupled through transformer 24, one of the oppositely-poled diodes 30 or 32 prevents the flow of current. Commutating capacitor 44 is protected from the transients, whereby this capacitor is then free to operate in its desired manner.

It will be realized from the foregoing description, that during the short transition interval when both of the silicon controlled rectifiers 34 and 36 are conductive, a slightly larger current tends to flow through inductor 38. Smoothing inductor 38 generates voltage opposing this increased current. Clamping diodes 54 and 56 minimize voltage disturbances caused both by inductor 38 and by the internal impedance of power source 10. It is to be noted that the circuit is operative even if diodes 54 and 56 are removed.

Again, during this transition interval, slight disturbances are produced in the transformer 24; and clamping diodes 58 and 60 are positioned and poled to minimize the disturbances therein.

In this way my invention provides a D.C. to A.C. converter that is protected from transients produced in the load circuits; and thus operates properly at all times.

In the foregoing discussion it was assumed that units 30 and 32 became conductive at the precise instant that this condition became necessary. This result may be achieved by selection of units that become conductive upon the presence of the desired voltage across them. However I have found that if units 30 and 32 are controlled rectifiers such as, for example, silicon controlled rectifiers, they may be used to control the power delivered to loads 12, 14 and 16. Their effect may be more readily understood from a consideration of the waveforms of FIGURE 2. Here waveforms 62 represents the gating signal applied to silicon controlled rectifier 34; and waveform 64 represents the gating signal applied to silicon controlled rectifier 36. It will be noted that waveforms 62 and 64 are of opposite polarity.

In order to provide a regulated mode of operation, waveform 68 shows the type of gating signal applied between the gating electrode and the cathode of unit 30. It will be seen by comparing waveform 62 and 68 that they are synchronized; except that the positive portions of waveform 68 start at a later time in each cycle. Waveform 70 shows the gating signal applied, relative to its cathode, to the control electrode of rectifier 32. Except for the starting pulse 73, it should be noted that waveforms 64 and 70 have the same relative time relation as waveforms 62 and 68.

To start the controlled mode of operation, silicon controlled rectifier 34 is gated into its conducting state by the first positive pulse 71 of gating signal waveform 62; and simultaneously a short positive-going pulse 73 of gating signal 70 is applied to the gating electrode of silicon controlled rectifier 32. These gating signals permit charging current to flow from the D.C. power source through rectifier 32, capacitance 44, silicon controlled rectifier 34, smoothing inductance 38, and back to the power source. This flow is of a momentary nature, and merely charges up commutating capacitor 44.

At the next instant a gating signal 77 is applied, relative to its cathode, to the control electrode of controlled rectifier 30 which causes current to flow from power source 10, through rectifiers 30 and 34, through inductor 38 to power source 10. Then gating signal 75 of waveform 64 causes silicon controlled rectifier 36 to become conductive and condenser 44 discharges through rectifier 36 and the cathode-to-anode path of rectifier 34, reducing the anode-to-cathode current of rectifier 34 to zero. But note that rectifier 30 still conducts to charge condenser 44. The charging of condenser 44 occurs rapidly. When condenser 44 is charged, the anode-to-cathode current through diode 30 reduces to zero. Because of symmetry of the circuit, it may be seen that signal 79 causes conduction from source 10, through the bottom portion of winding 22, through diodes 32 and 36, through inductor 38 to source 10. The sequence continues to cause diode 34 to conduct whereby condenser 44 discharges and reduces to zero the anode-to-cathode current of rectifier 36 whereupon condenser 44 is charged through rectifiers 32 and 40 which reduces to zero the anode-to-cathode current of rectifier 32. The cycle is then ready to repeat by the application of the second pulse voltage, of waveform 68, between the control electrode and cathode of rectifier 30.

The resultant output voltage waveform at terminal 51 is shown at 66A of FIGURE 2. It will be seen that the output voltage waveform 66 occurs when elements 30 and 32 are diodes. However, when elements 30 and 32 are controlled rectifiers, the output voltage occurs for only a portion of the time interval as compared with output waveform 66.

When the gating signals applied to the control electrodes of rectifiers 30 and 32 are delayed even more each cycle as shown in waveforms 62B and 64B, the output voltage of the circuit across terminals 51 is as shown in waveform 66B. As may be seen by comparing output waveform 66B with the other output waveforms 66A and 66, the new output waveform 66B results in an output signal of the same frequency, but of a much lower average amplitude.

The regulating feature is used in the schematic diagram of FIGURE 3. This shows a plurality of loads, one of which is a rectifier 81 that converts the 400 cycle signal to a D.C. signal of some voltage other than that of the original power source. The circuit of FIGURE 3 also has a sampling winding 80 and a rectifying circuit 82 that produces a substantially direct-voltage sampling signal that is applied to a difference amplifier 84. Difference amplifier 84 also receives a potential from a reference source 86; and its operation is such that its output is a difference signal that varies in polarity and magnitude depending upon the difference between the sampling signal and that from the reference source.

If, for example, the sampling signal is too large, the difference signal causes adjustable-delay circuit 88 to produce a regulating gating waveform that is delayed in a manner to cause the width of the output voltage signal to be decreased. See output waveform 66B. If the sampling signal is too small, the operation of the circuit 88 causes the regulating gating waveform to start earlier each cycle, thus tending to produce an output voltage waveform more like waveform 66A.

It is to be noted that the charge on fully charged capacitor 44 is so small that the charging current does not significantly affect the output voltage waveform.

Further, inductor 38 need not be an iron core inductor. It may, for example, be just the inductance of the leads connecting diodes 34 and 36 to power source 10.

In this way my invention protects against transients, has a controllable output, and may be self-regulating so that the output of the converter meets the standard established by a reference source.

If for some reason it is desired to connect the negative terminal of D.C. source 10 to point 20, this may be done by suitably modifying the disclosed circuitry. Units 30, 32, 34, and 36 would be reversed; the gating signals would be applied between the proper electrodes of the silicon controlled rectifiers; and the various waveforms would have their pulses poled and synchronized in accordance with the above teachings.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A circuit for converting a D.-C. voltage into an A.-C. voltage comprising:
    a transformer having a center-tapped primary winding and a secondary winding;
    first and second rectifiers, each having one electrode of each of at least two kinds of electrodes designated the anode and cathode electrodes, said rectifiers being connected by said first kind of electrode to opposite ends of said primary winding;
    a capacitor connected between the second said kind of electrodes of said rectifiers;
    third and fourth rectifiers, each having one electrode of each of said two kinds of electrodes and each having a control electrode, said third and fourth rectifiers having their second said kind of electrodes connected together, and the said first kind of electrode of said third and fourth rectifiers being connected to opposite terminals of said capacitors;
    a source of cyclic control voltage, connected to apply phase-opposing voltage to said control voltage electrodes;
    an inductor connected by a first terminal to the second said kind of electrode of said third and fourth rectifiers;
    first, second, third and fourth clamping diodes each having one electrode of each of said two kinds of electrodes, the first said kind of electrode of said clamping diode being connected together to the second terminal of said inductor, the second said kind of electrode of said first and second clamping diodes being connected to opposite ends of said primary winding, the second said kind of electrode of said third and fourth diode being connected to opposite terminals of said capacitors; and a source of D.-C. voltage connected between said center tap and the second terminal of said inductor.

2. A circuit as recited in claim 1 in which said source of cyclic control voltage is a square wave voltage generating means.

3. A device as recited in claim 2, and further comprising a source of D.-C. power connected by its positive terminal to the center tap of said primary winidng and by its negative terminal to said second terminal of said inductor.

4. A device as recited in claim 13 and further comprising a plurality of electrical loads and means for switching said loads to connect and disconnect them from the said secondary winding.

5. A device as recited in claim 2 and further comprising:
    a control electrode connected to each of said first and second rectifiers;
    means for sensing the voltage on said secondary winding, and adapted to rectify and determine the average of said voltage;
    means for comparing said last mentioned average voltage with a predetermined voltage to generate a difference voltage;
    means connected to said square wave generating means to generate rectangular waves of varying time durations, said time duration being controlled in response to said difference signal, the output of said last mentioned means being connected in phase-opposition to the said control electrodes of said first and second rectifiers.

6. A device as recited in claim 2 and further comprising:
    a control electrode connected to each of said first and second rectifiers;
    means for sensing the wave form of voltage on said secondary winding, and adapted to rectify and determine the average of said voltage;
    means for comparing said last mentioned value with a predetermined voltage value to generate a difference voltage;
    means connected to said square wave generating means to generate rectangular waves of varying time duration, said time duration being controlled in response to said difference signal, the output of said last mentioned means being connected in phase-opposition to the said control electrodes of said first and second rectifiers; and means for applying a starting pulse to the control electrode of one of said first and second rectifiers.

References Cited by the Examiner

UNITED STATES PATENTS

| | | | |
|---|---|---|---|
| 3,010,062 | 11/1961 | Van Emden | 321—18 |
| 3,075,136 | 1/1963 | Jones | 321—45 |
| 3,085,190 | 4/1963 | Kearns et al. | 321—45 |
| 3,197,691 | 7/1965 | Gilbert | 321—18 |

FOREIGN PATENTS

| | | |
|---|---|---|
| 1,303,427 | 7/1962 | France. |
| 1,345,285 | 11/1963 | France. |

JOHN F. COUCH, *Primary Examiner.*

LLOYD McCOLLUM, *Examiner.*

A. J. GAJARSA, M. L. WACHTELL,
*Assistant Examiners.*